US012585508B2

(12) United States Patent
Li et al.

(10) Patent No.: US 12,585,508 B2
(45) Date of Patent: Mar. 24, 2026

(54) RECONSTRUCTING AND VERIFYING PROPRIETARY CLOUD BASED ON STATE TRANSITION

(71) Applicants:Beijing JingDong ShangKe Information Technology Co., Ltd., Beijing (CN); Beijing Jingdong Century Trading Co., Ltd., Beijing (CN)

(72) Inventors: Wenqiao Li, Beijing (CN); Dayong Wang, Beijing (CN); Shi Bai, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 426 days.

(21) Appl. No.: 18/247,243

(22) PCT Filed: Oct. 12, 2021

(86) PCT No.: PCT/CN2021/123254
§ 371 (c)(1),
(2) Date: Mar. 29, 2023

(87) PCT Pub. No.: WO2022/078322
PCT Pub. Date: Apr. 21, 2022

(65) Prior Publication Data
US 2023/0367651 A1 Nov. 16, 2023

(30) Foreign Application Priority Data
Oct. 13, 2020 (CN) .......................... 202011093747.8

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ........ G06F 9/5077; G06F 9/5072; G06F 8/61; G06F 9/45533; H04L 41/0866;
(Continued)

(56) References Cited

U.S. PATENT DOCUMENTS 11,202,378 B1 * 12/2021 Gao ...................... H05K 5/0291
11,445,009 B1 * 9/2022 Ji ........................... H04L 67/306
(Continued)

FOREIGN PATENT DOCUMENTS

CN 109327490 2/2019
CN 111193782 5/2020
(Continued)

OTHER PUBLICATIONS

International Search Report and Written Opinion, issued in the corresponding PCT Application No. PCT/CN2021/123254, dated Jan. 13, 2022, 10 pages.

*Primary Examiner* — Benjamin C Wu
(74) *Attorney, Agent, or Firm* — HSML P.C.

(57) ABSTRACT

A method of reconstructing and verifying a proprietary cloud based on state transition is provided, including: obtaining information of an underlying infrastructure platform of a proprietary cloud server cluster to be constructed; if the underlying infrastructure platform meets the deployment requirement, obtaining cluster gene information of a standard proprietary cloud platform, and performing refactoring of an underlying system component, refactoring of an underlying dependency component and refactoring of a product line of a proprietary cloud platform according to the cluster gene information and a state of the proprietary cloud server cluster to be constructed; obtaining user demand (Continued)

information, configuring the cluster gene information according to the user demand information, and selecting a product line component of the standard proprietary cloud platform for deployment, so as to obtain a reconstructed proprietary cloud platform; and verifying a correctness and an effectiveness of a component of the reconstructed proprietary cloud platform.

17 Claims, 10 Drawing Sheets

(58) Field of Classification Search
CPC ..... H04L 41/12; H04L 67/10; H04L 41/0803; H04L 41/0876; H04L 67/50
See application file for complete search history.

(56) References Cited

U.S. PATENT DOCUMENTS

| | | | | |
|---|---|---|---|---|
| 12,322,478 | B2 * | 6/2025 | Shen | G06F 8/71 |
| 2002/0087734 | A1 | 7/2002 | Marshall et al. | |
| 2013/0227558 | A1 * | 8/2013 | Du | G06F 9/5077 |
| | | | | 718/1 |
| 2014/0280961 | A1 * | 9/2014 | Martinez | H04L 41/40 |
| | | | | 709/226 |
| 2014/0297733 | A1 * | 10/2014 | Wang | G06F 3/0604 |
| | | | | 709/203 |
| 2015/0106612 | A1 * | 4/2015 | Cao | G06F 9/4416 |
| | | | | 713/2 |
| 2018/0084039 | A1 * | 3/2018 | Wang | H04L 67/60 |
| 2020/0073764 | A1 * | 3/2020 | Neichev | G06F 11/1469 |
| 2020/0201666 | A1 * | 6/2020 | Aron | H04L 67/53 |
| 2020/0218580 | A1 * | 7/2020 | Kim | G06F 9/5072 |
| 2020/0293216 | A1 * | 9/2020 | Su | G06F 3/0604 |
| 2023/0297366 | A1 * | 9/2023 | Wigglesworth | G06F 8/35 |
| | | | | 717/120 |
| 2023/0367577 | A1 * | 11/2023 | Bai | G06F 8/65 |
| 2023/0393836 | A1 * | 12/2023 | Bai | G06F 8/65 |
| 2023/0420083 | A1 * | 12/2023 | Shen | G16B 45/00 |
| 2024/0012717 | A1 * | 1/2024 | Mitkar | G06F 11/1448 |
| 2024/0129310 | A1 * | 4/2024 | Andrews | H04L 63/0236 |

FOREIGN PATENT DOCUMENTS

| | | |
|---|---|---|
| CN | 111343016 | 6/2020 |
| CN | 112333004 | 2/2021 |
| CN | 112333242 | 2/2021 |

* cited by examiner

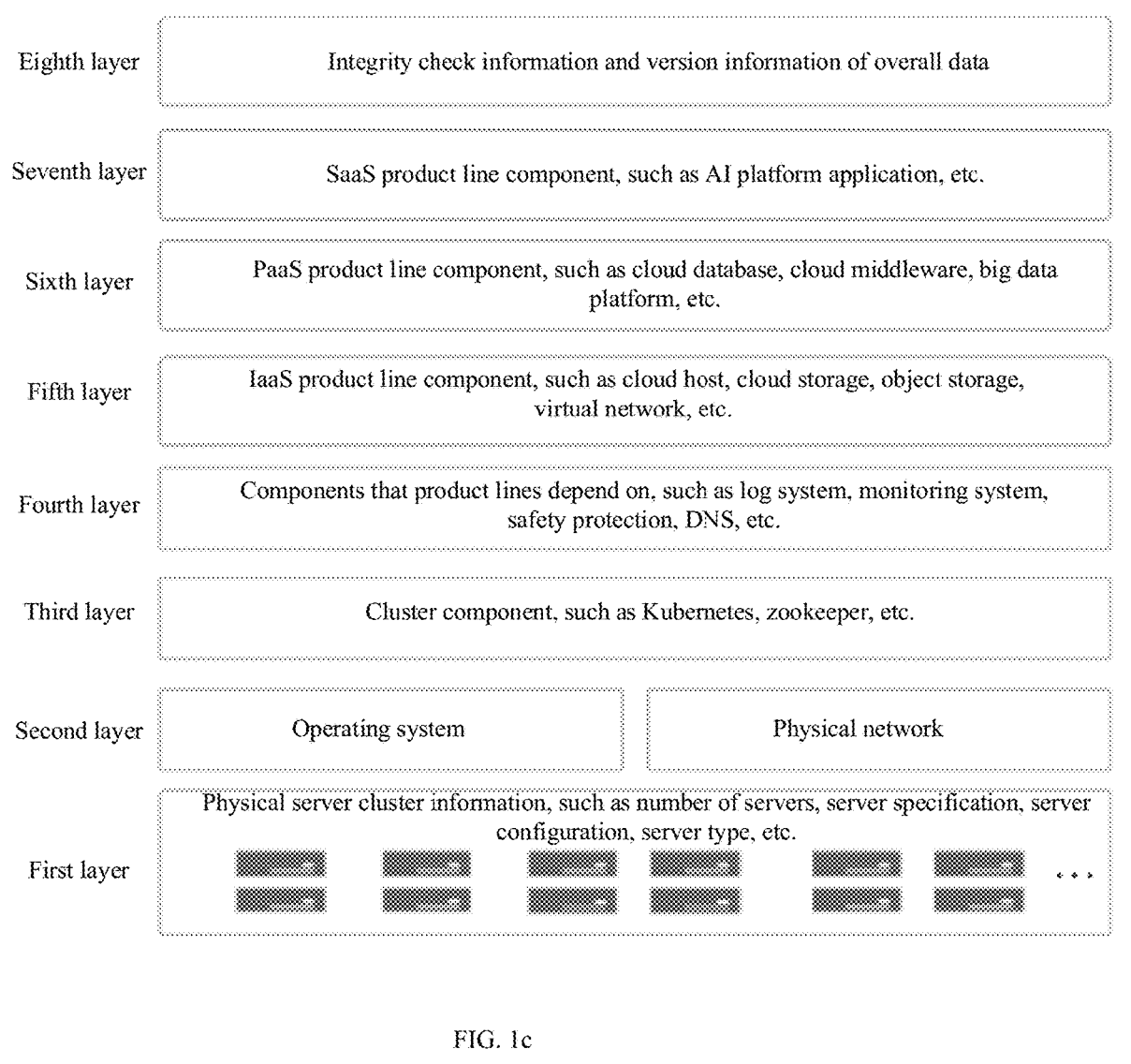

| | |
|---|---|
| Eighth layer | Integrity check information and version information of overall data |
| Seventh layer | SaaS product line component, such as AI platform application, etc. |
| Sixth layer | PaaS product line component, such as cloud database, cloud middleware, big data platform, etc. |
| Fifth layer | IaaS product line component, such as cloud host, cloud storage, object storage, virtual network, etc. |
| Fourth layer | Components that product lines depend on, such as log system, monitoring system, safety protection, DNS, etc. |
| Third layer | Cluster component, such as Kubernetes, zookeeper, etc. |
| Second layer | Operating system / Physical network |
| First layer | Physical server cluster information, such as number of servers, server specification, server configuration, server type, etc. |

FIG. 1c

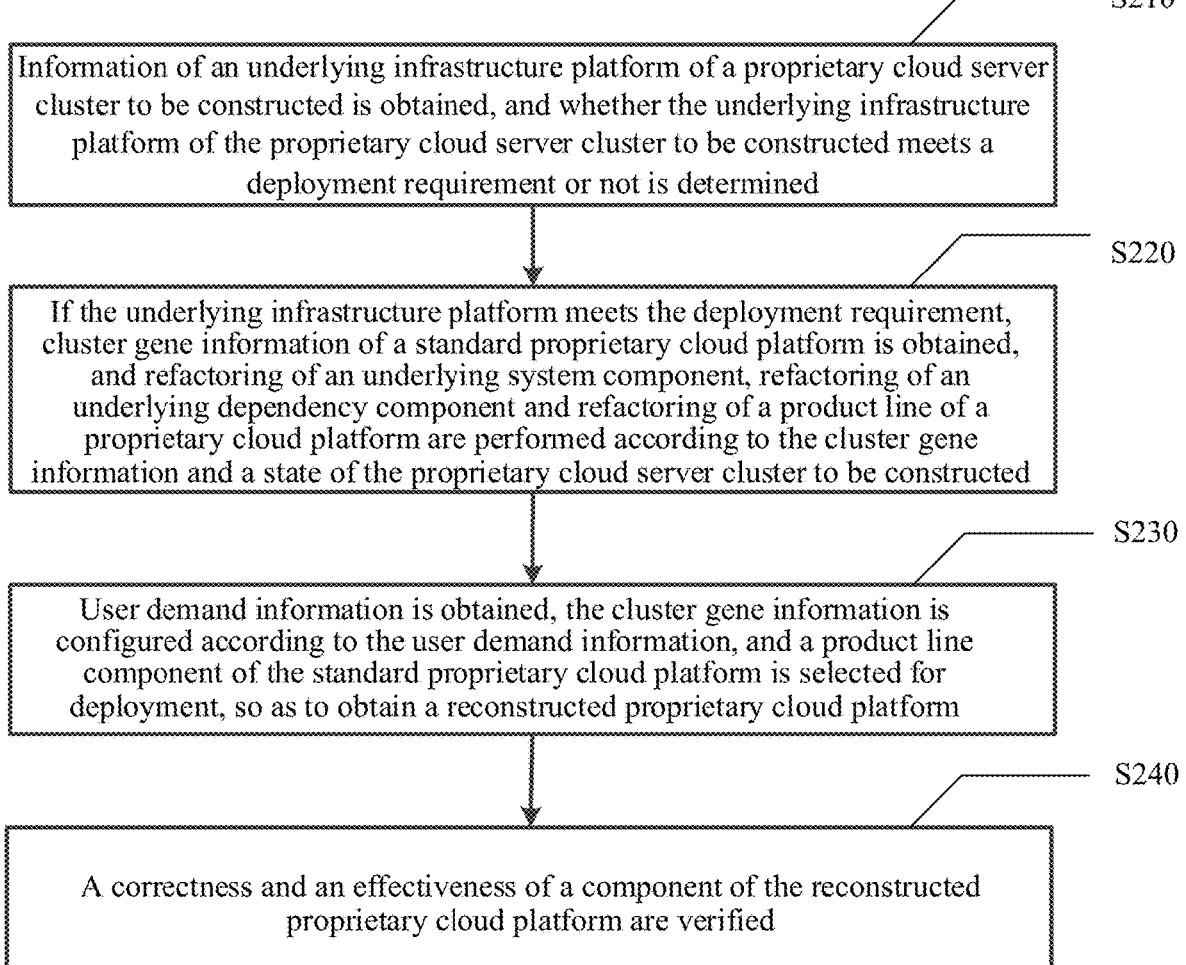

S210

Information of an underlying infrastructure platform of a proprietary cloud server cluster to be constructed is obtained, and whether the underlying infrastructure platform of the proprietary cloud server cluster to be constructed meets a deployment requirement or not is determined

S220

If the underlying infrastructure platform meets the deployment requirement, cluster gene information of a standard proprietary cloud platform is obtained, and refactoring of an underlying system component, refactoring of an underlying dependency component and refactoring of a product line of a proprietary cloud platform are performed according to the cluster gene information and a state of the proprietary cloud server cluster to be constructed

S230

User demand information is obtained, the cluster gene information is configured according to the user demand information, and a product line component of the standard proprietary cloud platform is selected for deployment, so as to obtain a reconstructed proprietary cloud platform

S240

A correctness and an effectiveness of a component of the reconstructed proprietary cloud platform are verified

FIG. 2

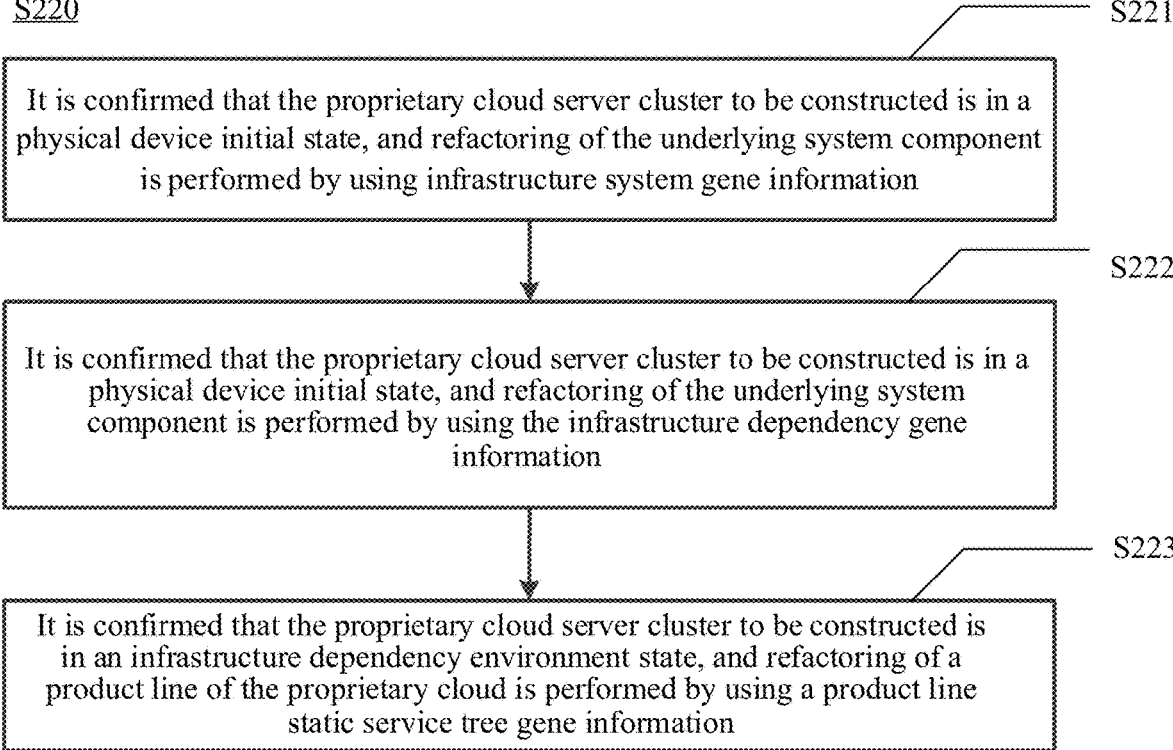

S220

S221

It is confirmed that the proprietary cloud server cluster to be constructed is in a physical device initial state, and refactoring of the underlying system component is performed by using infrastructure system gene information

S222

It is confirmed that the proprietary cloud server cluster to be constructed is in a physical device initial state, and refactoring of the underlying system component is performed by using the infrastructure dependency gene information

S223

It is confirmed that the proprietary cloud server cluster to be constructed is in an infrastructure dependency environment state, and refactoring of a product line of the proprietary cloud is performed by using a product line static service tree gene information

FIG. 3

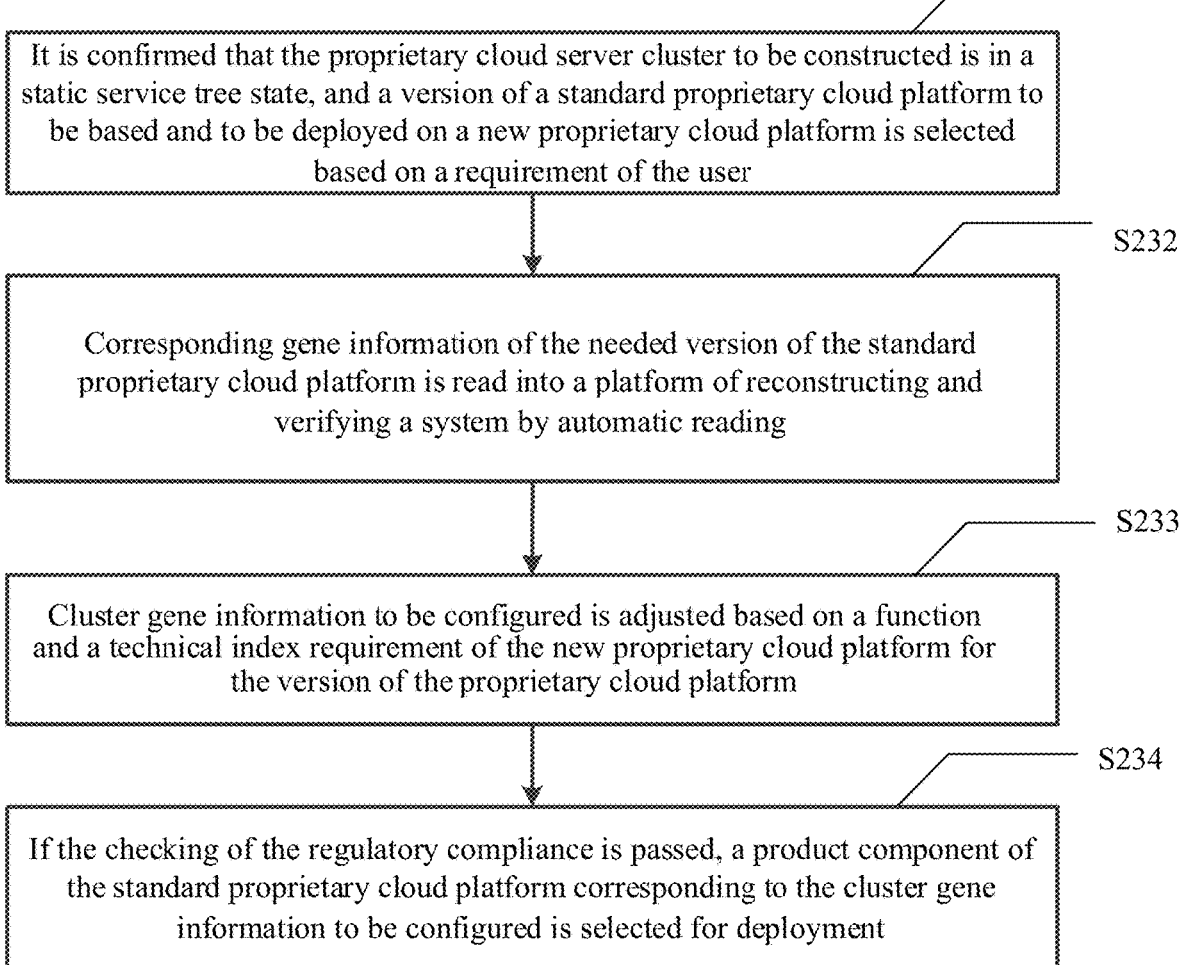

S230

It is confirmed that the proprietary cloud server cluster to be constructed is in a static service tree state, and a version of a standard proprietary cloud platform to be based and to be deployed on a new proprietary cloud platform is selected based on a requirement of the user

S231

Corresponding gene information of the needed version of the standard proprietary cloud platform is read into a platform of reconstructing and verifying a system by automatic reading

S232

Cluster gene information to be configured is adjusted based on a function and a technical index requirement of the new proprietary cloud platform for the version of the proprietary cloud platform

S233

If the checking of the regulatory compliance is passed, a product component of the standard proprietary cloud platform corresponding to the cluster gene information to be configured is selected for deployment

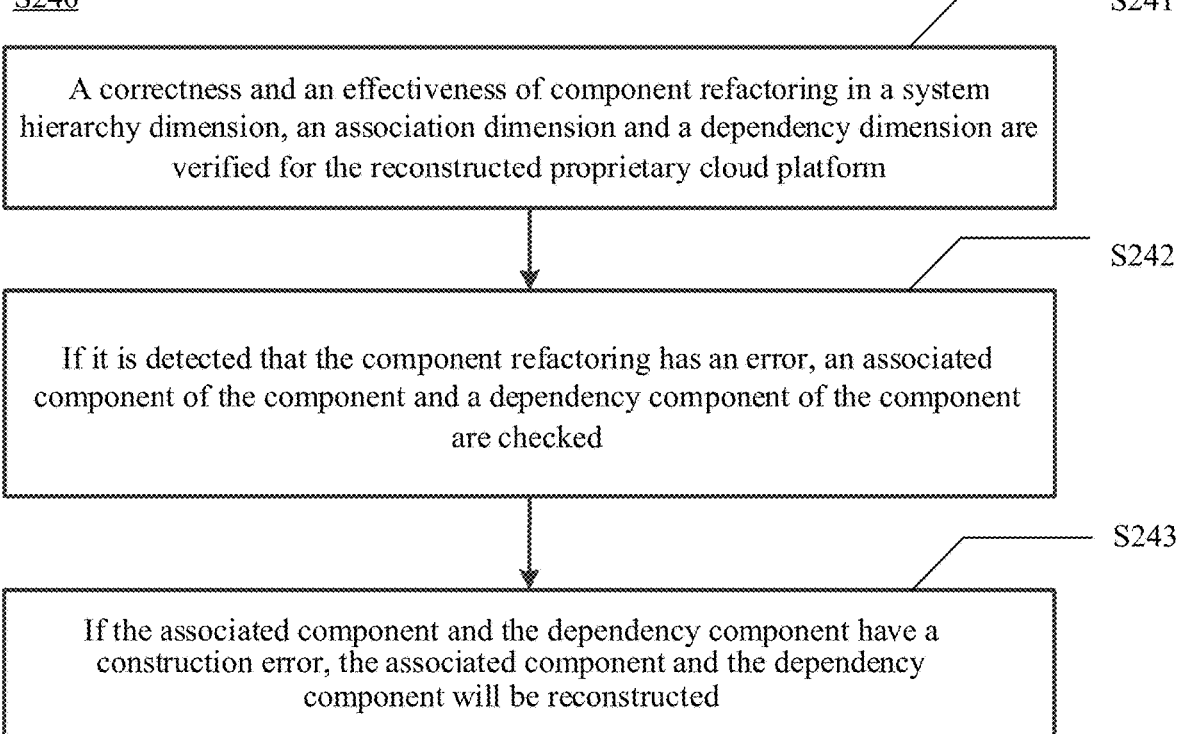

S241

A correctness and an effectiveness of component refactoring in a system hierarchy dimension, an association dimension and a dependency dimension are verified for the reconstructed proprietary cloud platform

S242

If it is detected that the component refactoring has an error, an associated component of the component and a dependency component of the component are checked

S243

If the associated component and the dependency component have a construction error, the associated component and the dependency component will be reconstructed

FIG. 6

RECONSTRUCTING AND VERIFYING PROPRIETARY CLOUD BASED ON STATE TRANSITION

CROSS-REFERENCE TO RELATED APPLICATION(S)

This application corresponds to PCT Application No. PCT/CN2021/123254, which claims priority to Chinese Patent Application No. 202011093747.8 filed on Oct. 13, 2020, the contents of which are incorporated herein in their entireties by reference.

TECHNICAL FIELD

The present disclosure relates to a field of computer technology, and more specifically, to a method and an apparatus of reconstructing and verifying a proprietary cloud based on state transition.

BACKGROUND

Proprietary cloud is generally based on a hierarchical management architecture. A bottom layer supports physical server clusters and supports various business systems for users. The proprietary cloud provides customers with rich product lines through service catalogs. The product line is divided into multiple applications, which are interconnected with each other. Application service programs provided by each product line may be organized and managed based on container cluster technology. Container technology may realize a gradual transition for a business system based on a flexible transition capability of the container itself. However, it is still lacking of a systematic method of automatic reconstructing and verifying for a complex and large container cluster environment. The proprietary cloud has problems in cluster reconstruction, stability and other aspects.

SUMMARY

In view of this, the present disclosure provides a method and apparatus of automatic reconstructing and verifying of an instance proprietary cloud platform, which is the same or similar to a standard proprietary cloud platform. The automatic reconstruction and verification method and apparatus are replicated and built by using an obtained comprehensive container cluster gene information in a proprietary cloud container cluster environment.

One aspect of the present disclosure provides a method of reconstructing and verifying a proprietary cloud based on state transition, including:

obtaining information of an underlying infrastructure platform of a proprietary cloud server cluster to be constructed, and determining whether the underlying infrastructure platform of the proprietary cloud server cluster to be constructed meets a deployment requirement or not;

obtaining, if the underlying infrastructure platform meets the deployment requirement, cluster gene information of a standard proprietary cloud platform, and performing refactoring of an underlying system component, refactoring of an underlying dependency component and refactoring of a product line of a proprietary cloud platform according to the cluster gene information and a state of the proprietary cloud server cluster to be constructed;

obtaining user demand information, configuring the cluster gene information according to the user demand information, and selecting a product line component of the standard proprietary cloud platform for deployment, so as to obtain a reconstructed proprietary cloud platform; and verifying a correctness and an effectiveness of a component of the reconstructed proprietary cloud platform.

According to the embodiment of the present disclosure, the obtaining information of an underlying infrastructure platform of a proprietary cloud server cluster to be constructed and determining whether the underlying infrastructure platform of the proprietary cloud server cluster to be constructed meets a deployment requirement or not includes:

obtaining underlying infrastructure gene information of the proprietary cloud server cluster to be constructed scanned by an out-of-band management system and an in-band management system;

comparing and analyzing the underlying infrastructure gene information with underlying infrastructure gene information of the standard proprietary cloud platform to obtain difference data; and determining whether the underlying infrastructure platform of the proprietary cloud server cluster to be constructed meets the deployment requirement or not according to the difference data, and marking the proprietary cloud server cluster to be constructed as a physical device initial state if the underlying infrastructure platform of the proprietary cloud server cluster to be constructed meets the deployment requirement.

According to the embodiment of the present disclosure, the refactoring of the underlying system component includes:

confirming that the proprietary cloud server cluster to be constructed is in the physical device initial state, and installing operating systems for servers of all services according to step-by step information of an operating system of the standard proprietary cloud in the cluster gene information;

configuring a network component according to the network topology gene information of the standard proprietary cloud in the cluster gene information; and creating a cluster component on a proprietary cloud platform to be constructed by cluster component information in the cluster gene information.

According to the embodiment of the present disclosure, the refactoring of the underlying dependency component includes:

confirming that the proprietary cloud server cluster to be constructed is in an infrastructure system environment state, and deploying the underlying dependency component of each product line on each node of the cluster component according to infrastructure dependency gene information in the cluster gene information.

According to the embodiment of the present disclosure, the refactoring of the product line of the proprietary cloud platform includes:

confirming that the proprietary cloud server cluster to be constructed is in an infrastructure dependency environment state, performing product component refactoring on IaaS product component, PaaS product component and SaaS product component, and marking the proprietary cloud server cluster to be constructed as a static service tree state after performing the product component refactoring.

According to the embodiment of the present disclosure, the component refactoring includes:

determining whether a resource associated with the component and a dependency component on which the component depends have been refactored or not, and refactoring, if it is determined that the resource associated with the component and the dependency component on which the component depends have been refactored, the component according to a gene information corresponding to the component.

According to the embodiment of the present disclosure, the obtaining user demand information, configuring the cluster gene information according to the user demand information and selecting a product line component of the standard proprietary cloud platform for deployment, includes:

confirming that the proprietary cloud server cluster to be constructed is in the static service tree state, and selecting a version of the standard proprietary cloud platform deployed in the proprietary cloud server cluster to be constructed based on the user demand information;

obtaining cluster gene information corresponding to the version of the standard proprietary cloud platform as cluster gene information to be configured;

adjusting, based on a function and technical index requirement of the proprietary cloud server cluster to be constructed, the cluster gene information to be configured, and checking a regulatory compliance of an adjustment process of the cluster gene information to be configured; and selecting, if the checking of the regulatory compliance is passed, a product component of the standard proprietary cloud platform corresponding to the cluster gene information to be configured for deployment.

According to the embodiment of the present disclosure, the verifying a correctness and an effectiveness of a component of the reconstructed proprietary cloud platform includes:

verifying, for the reconstructed proprietary cloud platform, a correctness and an effectiveness of component refactoring in a system hierarchy dimension, an association dimension and a dependency dimension;

checking, if it is determined that the component refactoring has an error, the component, an associated component of the component and a dependency component of the component; and refactoring, if the refactoring of the associated component and the dependency component has an error, the associated component and the dependency component until all components are refactored correctly.

According to another aspect of the present disclosure, there is provided an apparatus of reconstructing and verifying a proprietary cloud based on state transition, including:

an underlying infrastructure platform information detection module configured to obtain information of an underlying infrastructure platform of a proprietary cloud server cluster to be constructed, and determine whether the underlying infrastructure platform of the proprietary cloud server cluster to be constructed meets a deployment requirement or not;

a refactoring module configured to obtain cluster gene information of a standard proprietary cloud platform, and perform refactoring of an underlying system component, refactoring of an underlying dependency component and refactoring of a product line of a proprietary cloud platform according to the cluster gene information and a state of the proprietary cloud server cluster to be constructed;

a selecting deployment module configured to obtain user demand information, configure the cluster gene information according to the user demand information, and select a product line component of the standard proprietary cloud platform for deployment, so as to obtain a reconstructed proprietary cloud platform; and a verification module configured to verify a correctness and an effectiveness of a component of the reconstructed proprietary cloud platform.

According to another aspect of the present disclosure, there is provided an electronic device, including:

one or more processors; and a memory configured to store one or more programs, wherein the one or more programs, when executed by the one or more processors, cause the one or more processors to implement the method of reconstructing and verifying a proprietary cloud based on state transition as described above.

According to another aspect of the present disclosure, there is provided a computer readable storage medium storing executable instructions, wherein the executable instructions, when executed by a processor, cause the processor to implement the method of reconstructing and verifying a proprietary cloud based on state transition as described above.

According to the embodiment of the present disclosure, the problem of an overall replication and reconstruction of the container cluster of the standard proprietary cloud platform may be at least partially solved, and thus a degree of automation in a deployment process of the proprietary cloud platform may be improved, thereby effectively ensuring a technical effect of maintaining a consistency of technical indicators between a new built proprietary cloud platform and a stable standard proprietary cloud platform.

BRIEF DESCRIPTION OF THE DRAWINGS

The above and other purposes, features and advantages of the present disclosure will be clearer through the following description of embodiments of the present disclosure with reference to the accompanying drawings, in which:

FIG. 1c is a structural block diagram of a hierarchical gene information of a proprietary cloud cluster system in an embodiment of the present disclosure;

FIG. 2 schematically shows a flowchart of a method of reconstructing and verifying a proprietary cloud based on state transition according to an embodiment of the present disclosure;

FIG. 3 schematically shows a flowchart of performing refactoring based on the cluster gene information according to an embodiment of the present disclosure;

FIG. 5 schematically shows a flowchart of a method of performing deployment on a product component according to an embodiment of the present disclosure;

FIG. 6 schematically shows a flowchart of a method of verifying a reconstructed proprietary cloud platform according to an embodiment of the present disclosure;

DETAILED DESCRIPTION OF EMBODIMENTS

Figure 1A:
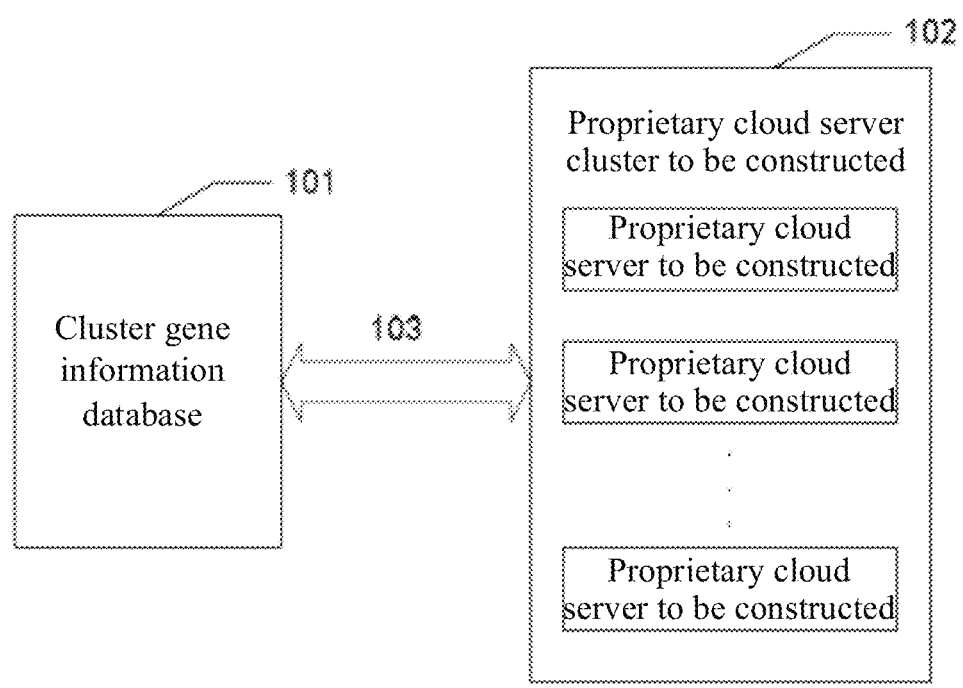
FIG. 1a schematically shows an exemplary system architecture in which a method and an apparatus of reconstructing and verifying a proprietary cloud based on state transition according to an embodiment of the present disclosure may be applied.

Hereinafter, embodiments of the present disclosure will be described with reference to accompanying drawings. However, it should be understood that these descriptions are only illustrative and are not intended to limit the scope of the present disclosure. In the following detailed description, for convenience of explanation, many specific details are described to provide a comprehensive understanding of embodiments of the present disclosure. However, it is obvious that one or more embodiments may also be implemented without these specific details. In addition, in the following description, description of the well-known structure and technology is omitted to avoid unnecessarily confusing concepts of the present disclosure.

The terms used herein are only intended to describe specific embodiments and are not intended to limit the present disclosure. The terms "comprise", "include", "contain", etc., used herein indicate the existence of the described feature, step, operation and/or component, but do not exclude the existence or addition of one or more other features, steps, operations or components.

All terms (including technical and scientific terms) used herein have meanings generally understood by those skilled in the art, unless otherwise defined. It should be noted that the terms used here should be interpreted as having the meaning consistent with the context of this specification, and should not be interpreted in an idealized or too rigid way.

In a case of using an expression similar to "at least one selected from A, B, or C", it should generally be interpreted in accordance with the meaning of the expression generally understood by those skilled in the art (for example, "a system having at least one of A, B and C" should include, but not be limited to, a system having A alone, a system having B alone, a system having C alone, a system having A and B, a system having A and C, a system having B and C, and/or a system having A, B, and C, etc.).

The embodiment of the present disclosure provides a method of reconstructing and verifying a proprietary cloud based on state transition, including a method of reconstructing and verifying a proprietary cloud based on state transition, including: obtaining information of an underlying infrastructure platform of a proprietary cloud server cluster to be constructed, and determining whether the underlying infrastructure platform of the proprietary cloud server cluster to be constructed meets a deployment requirement or not; if the underlying infrastructure platform meets the deployment requirement, obtaining cluster gene information of a standard proprietary cloud platform and performing refactoring of an underlying system component, refactoring of an underlying dependency component and refactoring of a product line of a proprietary cloud platform according to the cluster gene information and a state of the proprietary cloud server cluster to be constructed; obtaining user demand information, configuring the cluster gene information according to the user demand information, and selecting a product line component of the standard proprietary cloud platform for deployment, so as to obtain a reconstructed proprietary cloud platform; and verifying a correctness and an effectiveness of a component of the reconstructed proprietary cloud platform.

Since all containers in a cluster needs to be packed in a unified manner when the proprietary cloud cluster is sealed each time, much information in the cluster is fixed. When operation and maintenance personnel deploy same versions of the proprietary cloud platform in different environments, they often encounter various problems in a deployment due to the differences of the environments. The operation and maintenance personnel often need to understand and master fixed information and modification methods of multiple products at the time of the sealing to solve the problems encountered in the deployment, which greatly increases a deployment cost of the proprietary cloud. Besides, a cluster construction is achieved mainly relied on a function of automatic arrangement of K8S and according to an operation of configuration files and scripts in the existing technologies, which does not achieve a complete systematization and automation. In addition, images or programs are packed and redeployed in the existing technologies, and the components are relatively separated, without taking into account a complex mutual association and dependency relationship between components, which is prone to errors.

In order to solve the above problems, the embodiment of the present disclosure provides a method and an apparatus of reconstructing and verifying a proprietary cloud based on state transition. FIG. 1*a* schematically shows an exemplary system architecture in which a method and an apparatus of reconstructing and verifying a proprietary cloud based on state transition according to an embodiment of the present disclosure may be applied. It should be noted that FIG. 1*a* only shows an example of the system architecture in which the embodiment of the present disclosure may be applied, to help those skilled in the art understand the technical content of the present disclosure, but it does not mean that the embodiment of the present disclosure may not be applied to other devices, systems, environments or scenarios.

As shown in FIG. 1*a*, the system architecture 100 according to the embodiment may include a cluster gene information database 101, a proprietary cloud server cluster 102 to be constructed, and a network 103. The network 103 is a medium used to provide a communication link between the cluster gene information database 101 and the proprietary cloud server cluster 102 to be constructed. The network 103 may include various connection types, such as wired, wireless communication links or optical fiber cables, and the like.

The cluster gene information database 101 stores cluster gene information of a standard proprietary cloud platform. The standard proprietary cloud platform refers to a proprietary cloud platform environment, which ensures that a function, a performance, a stability, a scalability, a security and other technical indicators may meet a requirement of technical standard after a long time of research and development and quality verification. The cluster gene refers to structured information that may completely represent a number, a configuration, a composition, data, an association relationship, a dependency relationship and other key information of each component in the cluster. The cluster gene may be used to achieve an automatic construction and a component deployment of the same or similar cluster. The cluster gene information database 101 may be a data server associated with the proprietary cloud server cluster 102 to be constructed, or in other embodiments, the cluster gene information database 101 may also be configured as a server in the proprietary cloud server cluster 102 to be constructed.

The cluster gene information database 101 is connected to the proprietary cloud server cluster 102 to be constructed through the network 103. The proprietary cloud server cluster 102 to be constructed may obtain data information of the cluster gene information database 101 through the network 103, thus realizing a deployment of the proprietary cloud platform on the proprietary cloud server cluster 102 to be constructed. For example, a system of reconstructing and verifying a proprietary cloud based on state transition is based on K8S technology, and based on characteristics of containers in a K8S cluster, it is possible to effectively improve a degree of automatic processing of cluster gene information when replicated to a new proprietary cloud platform.

It should be noted that the method of reconstructing and verifying a proprietary cloud based on state transition provided by the embodiment of the present disclosure may generally be performed by the proprietary cloud server cluster 102 to be constructed. Accordingly, the apparatus of reconstructing and verifying a proprietary cloud based on state transition provided by the embodiment of the present disclosure may generally be disposed in the proprietary cloud server cluster 102 to be constructed. The method of reconstructing and verifying a proprietary cloud based on state transition provided by the embodiment of the present disclosure may also be performed by a server or a server cluster different from the proprietary cloud server cluster 102 to be constructed and communicated with the proprietary cloud server cluster 102 to be constructed. Accordingly, the apparatus of reconstructing and verifying a proprietary cloud based on state transition provided by the embodiment of the present disclosure may also be disposed in a server or server cluster different from the proprietary cloud server cluster 102 to be constructed and communicated with the proprietary cloud server cluster 102 to be constructed.

It should be understood that the number of the database, server and network in FIG. 1 is only schematic. There may be any number of servers and networks as desired in implementation.

Figure 1B:
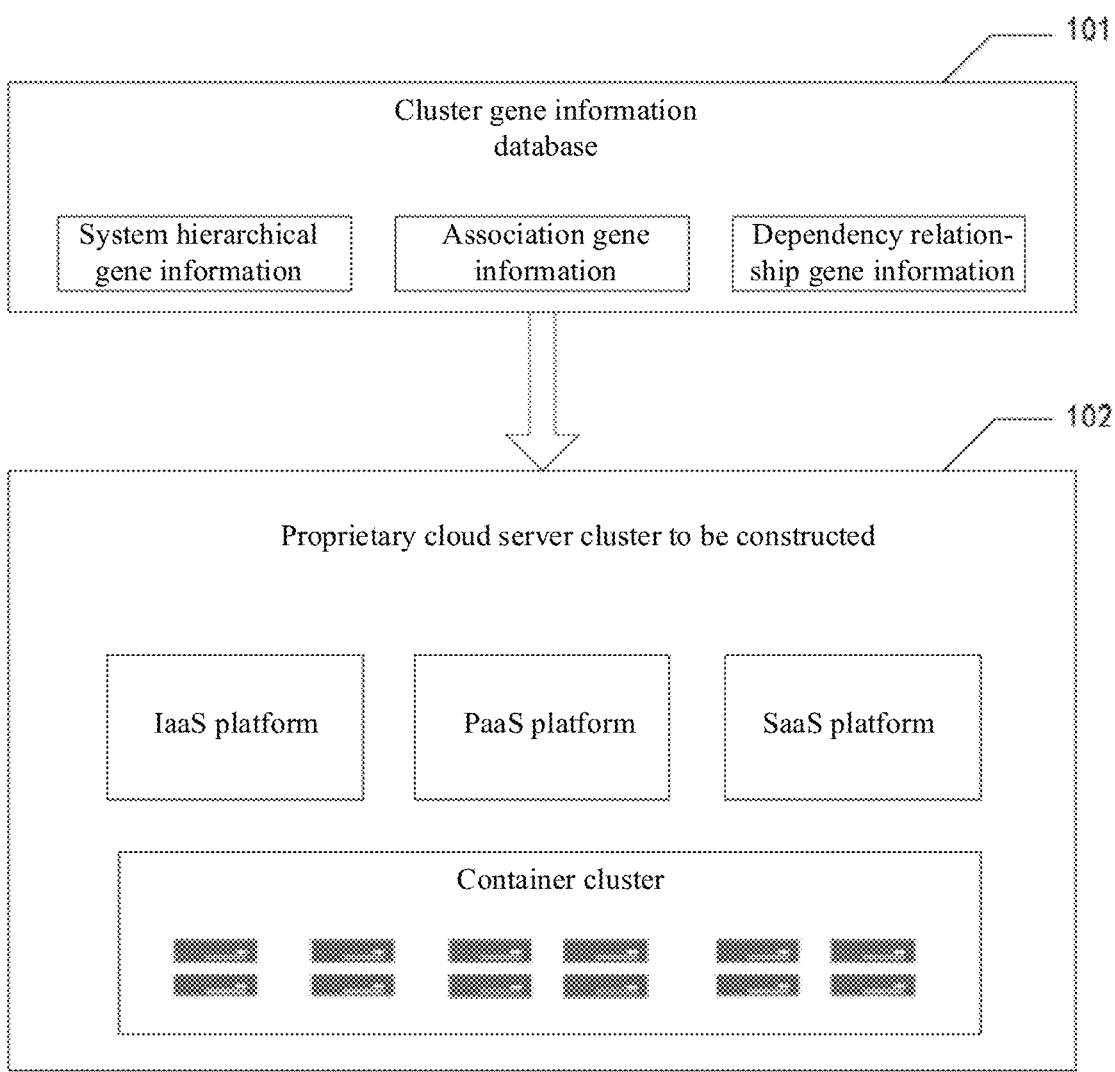
FIG. 1B schematically shows an implementation flow of a method and an apparatus of reconstructing and verifying a proprietary cloud based on state transition according to an embodiment of the present disclosure.

FIG. 1B schematically shows an implementation flow of a method and an apparatus of reconstructing and verifying a proprietary cloud based on state transition according to an embodiment of the present disclosure. According to the embodiment of the present disclosure, a reconstruction of the standard proprietary cloud platform is achieved in the proprietary cloud server cluster 102 to be constructed, based on the cluster gene information of the standard proprietary cloud platform stored in the cluster gene database 101.

In this embodiment, cluster gene information comprehensively acquired and collected from the standard proprietary cloud platform is stored, based on the cluster gene database 101. In a container cluster, the cluster gene may contain all key information of the container cluster and various containers having business applications contained therein based on an organizational characteristic of the container, and a reconstruction of a same or similar container cluster and service applications may be achieved in other server clusters based on these key information.

The cluster gene information includes information in three dimensions. A first dimension is information of eight layers forming the proprietary cloud cluster, that is, system hierarchical gene information, which realizes a discrete and full-coverage collection of modules and components. A composition analysis and information collection of modules and components is achieved through the system hierarchical gene information. A second dimension is an association relationship collection of each module and component in a product line of the cluster, that is, association gene information. A third dimension is a dependency relationship collection of each module and component in the product line of the cluster, that is, dependency relationship gene information.

A complete proprietary cloud cluster gene information collection is formed based on the above three dimensions. IaaS, PaaS, SaaS platforms and container clusters are built in the proprietary cloud server cluster 102 to be constructed by using the proprietary cloud cluster gene information collection, so as to achieve the reconstruction of the standard proprietary cloud platform. IaaS is a cloud platform service layer that includes an infrastructure cloud resource, such as a virtualized computing resource, a virtualized network resource and a virtualized storage resource. PaaS is a cloud platform service layer that provides a platform level cloud resource, such as a database, a middleware, a development component and a big data component. SaaS is a cloud platform service layer that provides a software resource for supporting a specific business.

Therefore, the system of reconstructing and verifying a proprietary cloud based on state transition in the embodiment of the present disclosure solves the technical problem that a manual implementation of the proprietary cloud deployment is prone to errors, and improves an accuracy and efficiency of an overall deployment of an automatic cluster. It is possible to effectively improve an efficient replication of the proprietary cloud platform cluster based on the cluster gene information, realize a truly comprehensive systematic automatic deployment of a proprietary cloud platform, and ensure that a stability, a component availability and a system performance of the new proprietary cloud platform are in consistent with a stability, a component availability and a system performance of the standard proprietary cloud platform.

FIG. 1c is a structural block diagram of a hierarchical gene information of a proprietary cloud cluster system in an embodiment of the present disclosure.

As shown in FIG. 1c, the proprietary cloud cluster system is divided into eight layers of cluster gene information from the bottom to the top. The first layer to the third layer are infrastructure system gene information. Specifically, the first layer of cluster gene information is information collected by automatically scanning a gene information of a physical server cluster through an out-of-band management system and an in-band management system, such as the number of servers, a server specification, a server configuration, a server type (management node, computing node, storage node, etc.). The second layer of cluster gene information is an information collected by automatically scanning an information such as an operating system, a network topology, etc., of a service server through a cloud platform operation and maintenance management system. The third layer of cluster gene information is cluster component information scanned and collected through the cloud platform operation and maintenance management system, such as Kubernetes, Zookeeper and other cluster components.

The fourth layer of cluster gene information is infrastructure dependency gene information, including an information collected by scanning and collecting an information of a component on which each product line of the proprietary cloud platform depends through the cloud platform operation and maintenance management system, such as a log system, a monitoring system, a security protection system, a DNS service, etc.

The fifth layer to the seventh layer of cluster gene information is gene information of a static service tree of the product line. Specifically, the fifth layer of cluster gene information is IaaS product component information scanned from the proprietary cloud platform by a proprietary cloud management platform and a Kubernetes cluster management module, and includes K8S service, a Pod, an API, a container, an application, grouping, a container image, etc. for supporting the product component. The sixth layer of cluster gene information is PaaS product component information scanned from the proprietary cloud platform by the proprietary cloud management platform and the Kubernetes cluster management module, and includes a virtual machine, K8S service, a Pod, an API, a container, an application, grouping, a container image, etc. for supporting the product component. The seventh layer of cluster gene information is SaaS product component information scanned from the proprietary cloud platform by the proprietary cloud management platform and the Kubernetes cluster management module, and includes a virtual machine, a virtual storage, a virtual network, PaaS service, K8S service, a Pod, an API, a container, an application, grouping, a container image, etc. for supporting the product component.

The eighth layer of cluster gene information is to verify a consistency and an integrity of all information collected and to generate a corresponding verification information and a version information. For example, the version information is determined based on a rule of automatic generation of the version, for example, a version number of a small version is increased automatically; or a version number of gene information of each module component of the cluster is generated based on the version number determined by manual.

Through the system of reconstructing and verifying a proprietary cloud based on state transition in the embodiment of the present disclosure, the new proprietary cloud platform is reconstructed by using the gene information of the container cluster in the proprietary cloud cluster gene information collection, so as to ensure that the structure and the function of the new proprietary cloud platform are in consistent with the structure and the function of the existing standard proprietary cloud platform, and ensure a consistency of a technical standard of the proprietary cloud platform.

FIG. 2 schematically shows a flowchart of a method of reconstructing and verifying a proprietary cloud based on state transition according to an embodiment of the present disclosure.

As shown in FIG. 2, the method includes operations S210 to S240.

In operation S210, information of an underlying infrastructure platform of a proprietary cloud server cluster to be constructed is obtained, and whether the underlying infrastructure platform of the proprietary cloud server cluster to be constructed meets a deployment requirement or not is determined.

In operation S220, if the underlying infrastructure platform meets the deployment requirement, cluster gene information of a standard proprietary cloud platform is obtained, and refactoring of an underlying system component, refactoring of an underlying dependency component and refactoring of a product line of a proprietary cloud platform are performed according to the cluster gene information and a state of the proprietary cloud server cluster to be constructed.

In operation S230, user demand information is obtained, the cluster gene information is configured according to the user demand information, and a product line component of the standard proprietary cloud platform is selected for deployment, so as to obtain a reconstructed proprietary cloud platform.

In operation S240, a correctness and an effectiveness of a component of the reconstructed proprietary cloud platform are verified.

The method shown in FIG. 2 will be further explained in combination with the specific embodiments.

In operation S210, underlying infrastructure gene information of the proprietary cloud server cluster to be constructed is automatically scanned by an out-of-band management system and an in-band management system, such as a number of servers, a server specification, a server configuration, a server type (management node, computing node, storage node, etc.). The underlying infrastructure gene information of the proprietary cloud server cluster to be constructed scanned by the out-of-band management system and the in-band management system is obtained, then the underlying infrastructure gene information is classified and compared with the underlying infrastructure gene information of the standard proprietary cloud platform to obtain difference data of an underlying platform. Whether the underlying infrastructure platform of the proprietary cloud server cluster to be constructed meets a deployment requirement is determined according to the difference data. If the difference of the infrastructure platform meets a technical requirement, a process of subsequent system reconstructing may be performed.

For example, whether the deployment requirement is met may be automatically determined by comparing the difference data with a preset threshold, or a difference information report may also be generated according to the difference data. The report is sent to the operation and maintenance personnel, so that the operation and maintenance personnel may understand the differences between a new constructed platform and the standard proprietary cloud platform in terms of infrastructure hardware facilities. If there is an important problem that affects the deployment of the proprietary cloud platform, the problem needs to be solved by manual.

When it is determined whether the underlying infrastructure platform of the proprietary cloud server cluster to be constructed meets the deployment requirement or not, the proprietary cloud server cluster to be constructed is marked as a physical device initial state. The physical device initial state represents an initial cluster state after all physical servers are put on a shelf, powered on and connected to the network device in a new computer room.

In operation S220, if the underlying infrastructure platform meets the deployment requirement, the cluster gene information of the standard proprietary cloud platform may be obtained by the cluster gene database. The cluster gene information includes infrastructure system gene information, infrastructure dependency gene information and gene information of a static service tree of a product line. Then, refactoring of the underlying system component, refactoring of the underlying dependency component and refactoring of the product line of the proprietary cloud platform are performed according to the cluster gene information.

FIG. 3 schematically shows a flowchart of performing refactoring based on the cluster gene information according to an embodiment of the present disclosure.

As shown in FIG. 3, the operation S220 includes operations S221 to S223.

In operation S221, it is confirmed that the proprietary cloud server cluster to be constructed is in a physical device initial state, and refactoring of the underlying system component is performed by using infrastructure system gene information of the cluster gene database. For example, the operation S221 includes operations S2211 to S2213.

In the operation S2211, operating systems for servers of all services are installed by the cloud platform operation and maintenance management system according to step-by-step information of an operating system of the standard proprietary cloud in the obtained infrastructure system gene information.

Then, in the operation S2212, all network components are configured by the cloud platform operation and maintenance management system and an out-of-band network management system according to network topology gene information of the standard proprietary cloud in the obtained infrastructure system gene information, so that the proprietary cloud platform to be constructed may have a network structure meeting the requirement. After finishing a deployment of physical network, whether the deployment of physical network is consistent with a deployment standard of a standard cloud platform or not is checked.

Then, in operation S2213, a cluster component such as Kubernetes or Zookeeper is constructed on the proprietary cloud platform to be constructed by the cloud platform operation and maintenance management system based on the cluster gene information. Thus, a deployment and construction of infrastructure system environment is completed. At this time, the proprietary cloud server cluster to be constructed is marked as an infrastructure system environment state. The infrastructure system environment state represents an infrastructure state after an installation of an operating system, a configuration of a network and an installation of an infrastructure component are performed on all server nodes in the physical device initial state.

In operation S222, it is confirmed that the proprietary cloud server cluster to be constructed is in an infrastructure system environment state, and refactoring of the underlying dependency component is performed by using the infrastructure dependency gene information of the cluster gene database. For example, the underlying dependency component of each product line is deployed on each node of the cluster component by the cloud platform operation and maintenance management system, based on the gene information such as log system, monitoring system, security protection system and DNS service of the components on which each product line of the standard proprietary cloud platform depends. At this time, the proprietary cloud server cluster to be constructed is marked as an infrastructure dependency environment state. The infrastructure dependency environment state represents a state after installing and deploying the infrastructure dependency software needed by the proprietary cloud platform cluster in the infrastructure system environment state.

In operation S223, it is confirmed that the proprietary cloud server cluster to be constructed is in an infrastructure dependency environment state, and refactoring of a product line of the proprietary cloud is performed by using a product line static service tree gene information. The product line static service tree gene information includes IaaS product component gene information, PaaS product component gene information and SaaS product component gene information.

Figure 4:
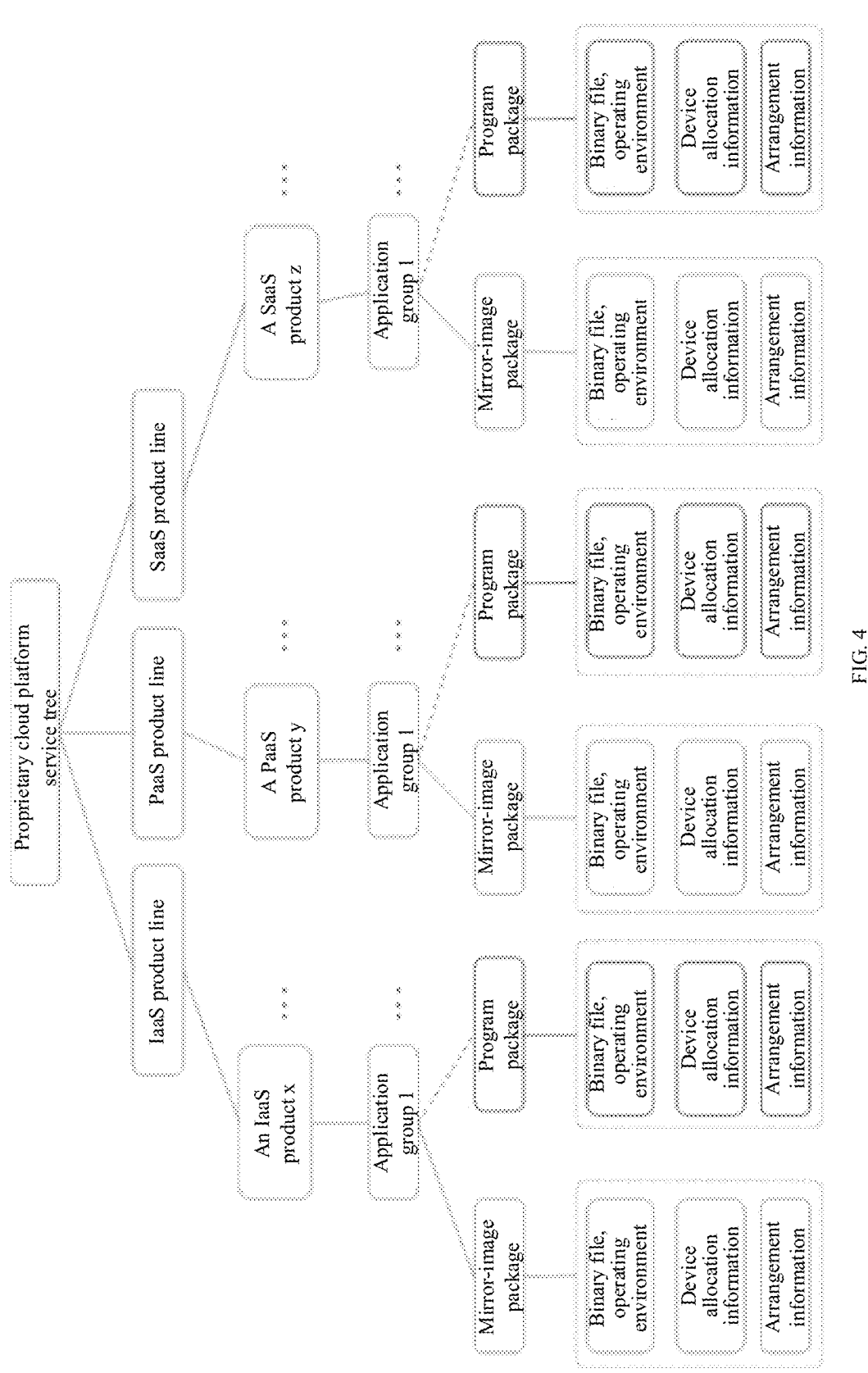
FIG. 4 schematically shows a schematic diagram of a product line of a proprietary cloud according to an embodiment of the present disclosure.

FIG. 4 schematically shows a schematic diagram of a product line of a proprietary cloud according to an embodiment of the present disclosure. As shown in FIG. 4, the proprietary cloud platform includes an IaaS product line, a PaaS product line and a SaaS product line. Each product line includes multiple products, and each product is divided into multiple application groups. The application groups may be built by mirror image packages or application packages. When refactoring the product line of the proprietary cloud, it is possible to configure and go online according to different application groups.

Specifically, the operation S223 includes operations S2231 to S2232.

In operation S2231, components such as consistent services, pods, APIs, containers, applications, groups, container mirror images are constructed on a K8S container cluster according to an association relationship of components and a dependency relationship of components and the consistency by the proprietary cloud management platform and Kubernetes cluster management module based on the IaaS product component gene information of the cluster gene database, and integrity of the components are verified.

In a process of automatic refactoring of a large number of components, it is needed to determine that the resource associated with a component and the dependency component on which the component depends have been constructed before constructing the component, and then the component is constructed according to relevant gene information.

For example, when constructing a cloud database MySQL product, an application group is constructed based on an arrangement gene information, then an access address and component version of the container mirror image or a program package is determined based on grouping information, then a device allocation and a service deployment are performed in sequence according to an arrangement order of the applications, and an application service is registered to realize an external service of the cloud database MySQL product.

In operation S2232, PaaS product components and SaaS product components on the proprietary cloud platform to be constructed are refactored according to operation S2231.

After finishing the above refactoring, in operation S230, user demand information is obtained, the cluster gene information is configured according to the user demand information, and a product line component of the standard proprietary cloud platform is selected for deployment, so as to obtain a reconstructed proprietary cloud platform. At this time, the proprietary cloud server cluster to be constructed is marked as a static service tree state. The static service tree state represents a cluster state of uploading the mirror image package and the program package of each product line to the system on a basis of the infrastructure dependency environment state.

FIG. 5 schematically shows a flowchart of a method of performing deployment on a product component according to an embodiment of the present disclosure.

As shown in FIG. 5, the method includes operations S231 to S233.

In operation S231, it is confirmed that the proprietary cloud server cluster to be constructed is in a static service tree state, and a version of a standard proprietary cloud platform to be based and to be deployed on a new proprietary cloud platform is selected based on a requirement of the user.

In operation S232, corresponding gene information of the needed version of the standard proprietary cloud platform is read into a platform of reconstructing and verifying a system by automatic reading.

In operation S233, cluster gene information to be configured is adjusted based on a function and a technical index requirement of the new proprietary cloud platform for the version of the proprietary cloud platform.

The configured cluster gene information needs to meet a technical regulatory. Therefore, in operation S234, the system automatically checks a regulatory compliance to prevent a system failure caused by modifying configuration. If the checking of the regulatory compliance is passed, a product component of the standard proprietary cloud platform corresponding to the cluster gene information to be configured is selected for deployment.

After finishing the deployment, the reconstructed proprietary cloud platform is obtained, and then in operation S240, a correctness and an effectiveness of a component of the reconstructed proprietary cloud platform are verified.

FIG. 6 schematically shows a flowchart of a method of verifying a reconstructed proprietary cloud platform according to an embodiment of the present disclosure.

As shown in FIG. 6, the method includes operations S241 to S242.

In operation S241, a correctness and an effectiveness of component refactoring in a system hierarchy dimension, an association dimension and a dependency dimension are verified for the reconstructed proprietary cloud platform. There are three rounds of verification, each round of which checks gene information of one dimension.

In operation S242, if it is detected that the component refactoring has an error, an associated component of the component and a dependency component of the component are checked. If the associated component and the dependency component have a construction error, the associated component and the dependency component will be reconstructed, and then the error components are reconstructed until all components are correctly constructed. At this time, the proprietary cloud server cluster to be constructed is marked as a cluster running state. The cluster running state represents a state that all application services are started and running normally after a device allocation and an arrangement of each application group based on an association relationship of the product line and a dependency relationship of the product line.

The embodiment of the present disclosure realizes reconstruction of the proprietary cloud platform based on a container cluster gene of the system hierarchy dimension, the association relationship dimension and the dependency relationship dimension, so as to replicate a full view of the standard container cluster to the new proprietary cloud platform more accurately. Besides, based on a reconstructing and verifying technology of the proprietary cloud platform of the cluster gene information of the proprietary cloud container cluster, a degree of automation in a deployment process of the proprietary cloud platform may be significantly improved and a consistency of technical indicators between the new proprietary cloud platform and a stable standard proprietary cloud platform may be effectively ensured.

Figure 7:
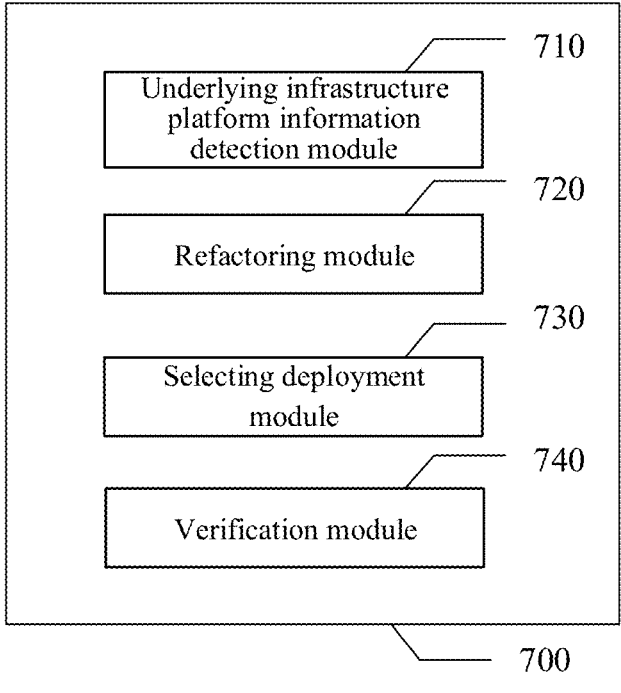
FIG. 7 schematically shows a block diagram of an apparatus of reconstructing and verifying a proprietary cloud based on state transition according to an embodiment of the present disclosure.

FIG. 7 schematically shows a block diagram of an apparatus of reconstructing and verifying a proprietary cloud based on state transition according to an embodiment of the present disclosure.

As shown in FIG. 7, an apparatus 700 of reconstructing and verifying a proprietary cloud based on state transition includes an underlying infrastructure platform information detection module 710, a refactoring module 720, a selecting deployment module 730 and a verification module 740.

The underlying infrastructure platform information detection module 710 is used to obtain information of an underlying infrastructure platform of a proprietary cloud server cluster to be constructed, and determine whether the underlying infrastructure platform of the proprietary cloud server cluster to be constructed meets a deployment requirement or not.

The refactoring module 720 is used to obtain cluster gene information of a standard proprietary cloud platform, and perform refactoring of an underlying system component, refactoring of an underlying dependency component and refactoring of a product line of a proprietary cloud platform according to the cluster gene information and a state of the proprietary cloud server cluster to be constructed.

The selecting deployment module 730 is used to obtain user demand information, configure the cluster gene information according to the user demand information, and select a product line component of the standard proprietary cloud platform for deployment, so as to obtain a reconstructed proprietary cloud platform.

The verification module 740 is used to verify a correctness and an effectiveness of a component of the reconstructed proprietary cloud platform.

According to the embodiment of the present disclosure, any two or more of modules and units, or at least some functions of any two or more of them may be implemented in one module. Any one or more of the modules and units according to the embodiment of the present disclosure may be divided into multiple modules for implementing. Any one or more of the modules and units according to the embodiment of the present disclosure may be at least partially implemented as a hardware circuit, such as a field programmable gate array (FPGA), a programmable logic array (PLA), a system on chip, a system on substrate, a system on package, an application specific integrated circuit (ASIC), or a hardware or a firmware that may be implemented by any other reasonable way to integrate or package the circuit, or any one of software, hardware and firmware or any combination of them. Alternatively, one or more of the modules and units according to the embodiment of the present disclosure may be at least partially implemented as a computer program module. When the computer program module is run, corresponding functions may be performed.

For example, any two or more of the underlying infrastructure platform information detection module 710, the refactoring module 720, the selecting deployment module 730 and the verification module 740 may be combined into one module, or any one of them may be split into multiple modules. Alternatively, at least some functions of one or more of these modules may be combined with at least some functions of other modules and implemented in one module. According to the embodiment of the present disclosure, at least one of the underlying infrastructure platform information detection module 710, the refactoring module 720, the selecting deployment module 730 and the verification module 740 may be at least partially implemented as a hardware circuit, such as a field programmable gate array (FPGA), a programmable logic array (PLA), a system on a chip, a system on a substrate, a system on a package, and an application specific integrated circuit (ASIC), or may be realized by hardware or firmware such as any other reasonable way to integrate or package the circuit, or by any one of software, hardware and firmware, or by an appropriate combination of any of them. Alternatively, at least one of the underlying infrastructure platform information detection module 710, the refactoring module 720, the selecting deployment module 730 and the verification module 740 may be at least partially implemented as a computer program module. When the computer program module is run, corresponding functions may be performed.

Figure 8:
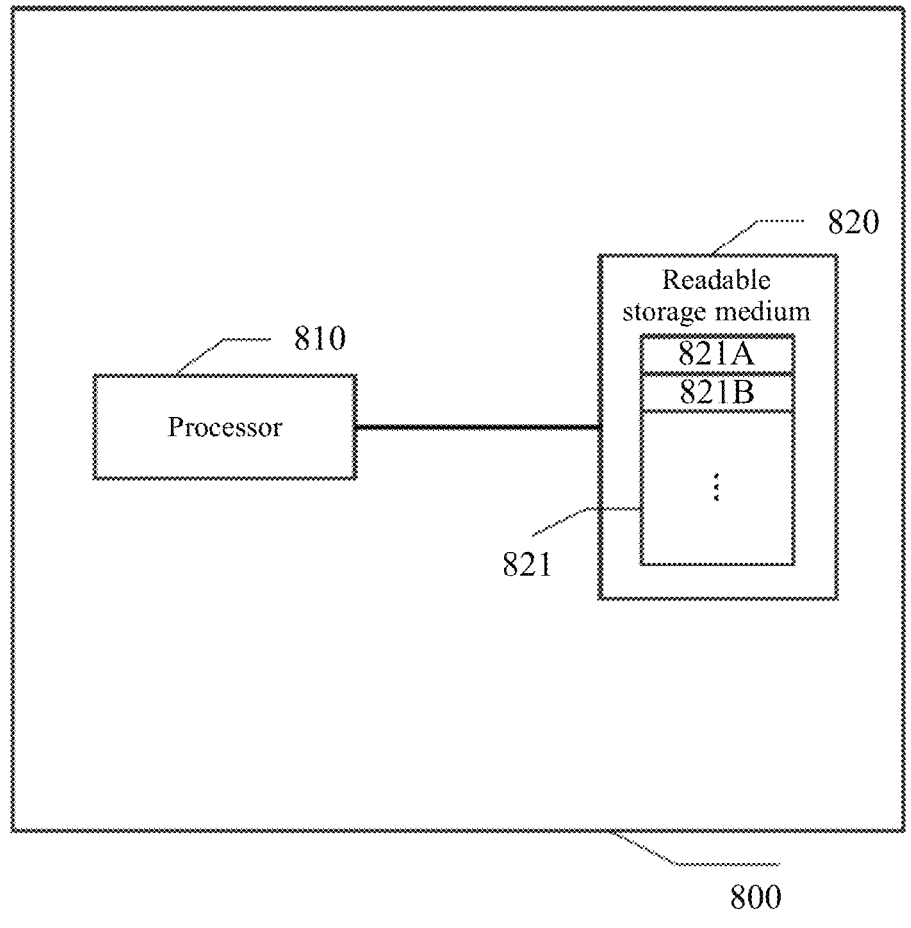
FIG. 8 schematically shows a block diagram of an electronic device according to an embodiment of the present disclosure.

FIG. 8 schematically shows a block diagram of an electronic device according to an embodiment of the present disclosure. The electronic device shown in FIG. 8 is only an example and should not limit the function and scope of use of an embodiment of the present disclosure.

As shown in FIG. 8, the electronic device 800 includes a processor 810 and a computer readable storage medium 820. The electronic device 800 may perform the method according to the embodiment of the present disclosure.

Specifically, the processor 810 may include, for example, general-purpose microprocessors, instruction set processors and/or related chipsets and/or application-specific microprocessors (for example, application specific integrated circuits (ASIC)), and the like. The processor 810 may also include on-board memory for caching purposes. The processor 810 may be a single processing unit or a plurality of processing units for performing different actions of the method flow according to the embodiment of the present disclosure.

The computer readable storage medium 820, for example, may be a non-volatile computer readable storage medium. Specific examples include but are not limited to: magnetic storage devices such as magnetic tape or hard disk (HDD); compact storage device such as compact disc (CD-ROM); memory, such as random access memory (RAM) or flash memory; and the like.

The computer readable storage medium 820 may include a computer program 821, which may include code/computer executable instructions that cause the processor 810 to implement a method according to an embodiment of the present disclosure or any variation thereof when executed by the processor 810.

The computer program 821 may be configured to have a computer program code including, for example, a computer program module. For example, in an example embodiment, the code in the computer program 821 may include one or more program modules such as 821A, 821B, . . . . It should be noted that a division mode and a number of modules are not fixed. Those skilled in the art may use appropriate program modules or program module combinations according to the actual situation. When these program module combinations are executed by the processor 810, the processor 810 may implement the method according to the embodiment of the present disclosure or any variation thereof.

According to the embodiment of the present disclosure, at least one of the underlying infrastructure platform information detection module 710, the refactoring module 720, the selecting deployment module 730 and the verification module 740 may be implemented as the computer program module described with reference to FIG. 8, which may implement the corresponding operations described above when executed by the processor 810.

The present disclosure also provides a computer readable storage medium, which may be included in the equipment/device/system described in the above embodiment. It may also exist alone without being assembled into the equipment/device/system. The above computer readable storage medium carries one or more programs. When the above one or more programs are executed, the method according to the embodiment of the present disclosure is implemented.

The flowcharts and block diagrams in the drawings illustrate the possible architecture, functions and operations of the systems, methods and computer program products according to various embodiments of the present disclosure. In this regard, each block in the flowchart or block diagram may represent a module, a program segment, or a part of codes. The above module, program segment, or part of codes contain one or more executable instructions for realizing the specified logic functions. It should also be noted that in some alternative implementations, the functions marked in the box may also occur in a different order from those marked in the drawings. For example, two consecutive boxes may actually be executed in parallel, and sometimes they may be executed in a reverse order, which depends on the function involved. It should also be noted that each block in the block diagrams or flowcharts and the combination of the blocks in the block diagrams or flowcharts may be realized by a specific hardware based system that performs the prescribed functions or operations, or by the combination of specific hardware and computer instructions.

Those skilled in the art may understand that although the present disclosure has been illustrated and described with reference to specific exemplary embodiments of the present disclosure, those skilled in the art should understand that without departing from the spirit and scope of the present disclosure defined by the appended claims and their equivalents, various changes in form and detail may be made to the present disclosure. Therefore, the scope of the present disclosure should not be limited to the above embodiments, but should be determined not only by the appended claims but also by the equivalents of the appended claims.

The invention claimed is:

1. A method of reconstructing and verifying a proprietary cloud based on state transition, comprising:

obtaining information of an underlying infrastructure platform of a proprietary cloud server cluster to be constructed, and determining whether the underlying infrastructure platform of the proprietary cloud server cluster to be constructed meets a deployment requirement or not;

obtaining, if the underlying infrastructure platform meets the deployment requirement, cluster gene information of a standard proprietary cloud platform, and performing refactoring of an underlying system component, refactoring of an underlying dependency component and refactoring of a product line of a proprietary cloud platform according to the cluster gene information and a state of the proprietary cloud server cluster to be constructed;

obtaining user demand information, configuring the cluster gene information according to the user demand information, and selecting a product line component of the standard proprietary cloud platform for deployment, so as to obtain a reconstructed proprietary cloud platform; and verifying a correctness and an effectiveness of a component of the reconstructed proprietary cloud platform, wherein the refactoring of the underlying system component comprises:

confirming that the proprietary cloud server cluster to be constructed is in a physical device initial state, and installing operating systems for servers of all services according to step-by-step information of an operating system of the standard proprietary cloud in the cluster gene information;

configuring a network component according to network topology gene information of the standard proprietary cloud in the cluster gene information; and constructing a cluster component on a proprietary cloud platform to be constructed by cluster component information in the cluster gene information.

2. The method of reconstructing and verifying a proprietary cloud based on state transition of claim 1, wherein the obtaining information of an underlying infrastructure platform of a proprietary cloud server cluster to be constructed and determining whether the underlying infrastructure platform of the proprietary cloud server cluster to be constructed meets a deployment requirement or not comprises:

obtaining underlying infrastructure gene information of the proprietary cloud server cluster to be constructed scanned by an out-of-band management system and an in-band management system;

comparing and analyzing the underlying infrastructure gene information with underlying infrastructure gene information of the standard proprietary cloud platform to obtain difference data; and determining whether the underlying infrastructure platform of the proprietary cloud server cluster to be constructed meets the deployment requirement or not according to the difference data, and marking the proprietary cloud server cluster to be constructed as the physical device initial state if the underlying infrastructure platform of the proprietary cloud server cluster to be constructed meets the deployment requirement.

3. The method of reconstructing and verifying a proprietary cloud based on state transition of claim 1, wherein the refactoring of the underlying dependency component comprises:

confirming that the proprietary cloud server cluster to be constructed is in an infrastructure system environment state, and deploying the underlying dependency component of each product line on each node of the cluster component according to infrastructure dependency gene information in the cluster gene information.

4. The method of reconstructing and verifying a proprietary cloud based on state transition of claim 3, wherein the refactoring of the product line of the proprietary cloud platform comprises:

confirming that the proprietary cloud server cluster to be constructed is in an infrastructure dependency environment state, performing product component refactoring on IaaS product component, PaaS product component and SaaS product component, and marking the proprietary cloud server cluster to be constructed as a static service tree state after performing the product component refactoring.

5. The method of reconstructing and verifying a proprietary cloud based on state transition of claim 4, wherein the component refactoring comprises:

determining whether a resource associated with the component and a dependency component on which the component depends have been refactored or not, and refactoring, if it is determined that the resource associated with the component and the dependency component on which the component depends have been refactored, the component according to a gene information corresponding to the component.

6. The method of reconstructing and verifying a proprietary cloud based on state transition of claim 4, wherein the obtaining user demand information, configuring the cluster gene information according to the user demand information and selecting a product line component of the standard proprietary cloud platform for deployment comprises:

confirming that the proprietary cloud server cluster to be constructed is in the static service tree state, and selecting a version of the standard proprietary cloud platform deployed in the proprietary cloud server cluster to be constructed based on the user demand information;

obtaining cluster gene information corresponding to the version of the standard proprietary cloud platform as cluster gene information to be configured; and adjusting, based on a function and technical index requirement of the proprietary cloud server cluster to be constructed, the cluster gene information to be configured, and checking a regulatory compliance of an adjustment process of the cluster gene information to be configured;

selecting, if the checking of the regulatory compliance is passed, a product component of the standard proprietary cloud platform corresponding to the cluster gene information to be configured for deployment.

7. The method of reconstructing and verifying a proprietary cloud based on state transition of claim 6, wherein the verifying a correctness and an effectiveness of a component of the reconstructed proprietary cloud platform comprises:

verifying, for the reconstructed proprietary cloud platform, a correctness and an effectiveness of component refactoring in a system hierarchy dimension, an association dimension and a dependency dimension;

checking, if it is determined that the component refactoring has an error, the component, an associated component of the component and a dependency component of the component; and refactoring, if the refactoring of the associated component and the dependency component has an error, the associated component and the dependency component until all components are refactored correctly.

8. An electronic device, comprising:

one or more processors; and a memory configured to store one or more programs;

wherein the one or more programs, when executed by the one or more processors, cause the one or more processors to implement the method of reconstructing and verifying a proprietary cloud based on state transition of claim 1.

9. The electronic device of claim 8, wherein the one or more processors are further configured for:

obtaining underlying infrastructure gene information of the proprietary cloud server cluster to be constructed scanned by an out-of-band management system and an in-band management system;

comparing and analyzing the underlying infrastructure gene information with underlying infrastructure gene information of the standard proprietary cloud platform to obtain difference data; and determining whether the underlying infrastructure platform of the proprietary cloud server cluster to be constructed meets the deployment requirement or not according to the difference data, and marking the proprietary cloud server cluster to be constructed as the physical device initial state if the underlying infrastructure platform of the proprietary cloud server cluster to be constructed meets the deployment requirement.

10. The electronic device of claim 8, wherein the one or more processors are further configured for:

confirming that the proprietary cloud server cluster to be constructed is in an infrastructure system environment state, and deploying the underlying dependency component of each product line on each node of the cluster component according to infrastructure dependency gene information in the cluster gene information.

11. The electronic device of claim 10, wherein the one or more processors are further configured for:

confirming that the proprietary cloud server cluster to be constructed is in an infrastructure dependency environment state, performing product component refactoring on IaaS product component, PaaS product component and SaaS product component, and marking the proprietary cloud server cluster to be constructed as a static service tree state after performing the product component refactoring.

12. The electronic device of claim 11, wherein the one or more processors are further configured for:

determining whether a resource associated with the component and a dependency component on which the component depends have been refactored or not, and refactoring, if it is determined that the resource associated with the component and the dependency component on which the component depends have been refactored, the component according to a gene information corresponding to the component.

13. The electronic device of claim 11, wherein the one or more processors are further configured for:

confirming that the proprietary cloud server cluster to be constructed is in the static service tree state, and selecting a version of the standard proprietary cloud platform deployed in the proprietary cloud server cluster to be constructed based on the user demand information;

obtaining cluster gene information corresponding to the version of the standard proprietary cloud platform as cluster gene information to be configured; and adjusting, based on a function and technical index requirement of the proprietary cloud server cluster to be constructed, the cluster gene information to be configured, and checking a regulatory compliance of an adjustment process of the cluster gene information to be configured;

selecting, if the checking of the regulatory compliance is passed, a product component of the standard proprietary cloud platform corresponding to the cluster gene information to be configured for deployment.

14. The electronic device of claim 13, wherein the one or more processors are further configured for:

verifying, for the reconstructed proprietary cloud platform, a correctness and an effectiveness of component refactoring in a system hierarchy dimension, an association dimension and a dependency dimension;

checking, if it is determined that the component refactoring has an error, the component, an associated component of the component and a dependency component of the component; and refactoring, if the refactoring of the associated component and the dependency component has an error, the associated component and the dependency component until all components are refactored correctly.

15. A non-transitory computer readable storage medium storing executable instructions, wherein the executable instructions, when executed by a processor, cause the processor to implement the method of reconstructing and verifying a proprietary cloud based on state transition of claim 1.

16. The non-transitory computer readable storage medium of claim 15, wherein the executable instructions further cause the processor to:

obtain underlying infrastructure gene information of the proprietary cloud server cluster to be constructed scanned by an out-of-band management system and an in-band management system;

compare and analyze the underlying infrastructure gene information with underlying infrastructure gene information of the standard proprietary cloud platform to obtain difference data; and determine whether the underlying infrastructure platform of the proprietary cloud server cluster to be constructed meets the deployment requirement or not according to the difference data, and mark the proprietary cloud server cluster to be constructed as the physical device initial state if the underlying infrastructure platform of the proprietary cloud server cluster to be constructed meets the deployment requirement.

17. The non-transitory computer readable storage medium of claim 15, wherein the executable instructions further cause the processor to:

confirm that the proprietary cloud server cluster to be constructed is in an infrastructure system environment state, and deploy the underlying dependency component of each product line on each node of the cluster component according to infrastructure dependency gene information in the cluster gene information.

* * * * *